(12) United States Patent
Okawara

(10) Patent No.: US 6,954,589 B2
(45) Date of Patent: Oct. 11, 2005

(54) LENS CONTROL APPARATUS, LENS CONTROL METHOD AND CAMERA

(75) Inventor: Hiroto Okawara, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/644,767

(22) Filed: Aug. 21, 2003

(65) Prior Publication Data

US 2004/0037547 A1 Feb. 26, 2004

(30) Foreign Application Priority Data

Aug. 23, 2002 (JP) ......................................... 2002-243408

(51) Int. Cl.$^7$ ............................................. G03B 17/00
(52) U.S. Cl. ........................................... 396/87; 396/82
(58) Field of Search .............................. 396/81, 82, 85, 396/87

(56) References Cited

U.S. PATENT DOCUMENTS

| | | | |
|---|---|---|---|
| 5,204,710 A | * 4/1993 | Tsukamoto et al. | ........... 396/85 |
| 5,406,345 A | * 4/1995 | Hirasawa | ...................... 396/86 |
| 5,687,403 A | * 11/1997 | Ohtake | ......................... 396/82 |
| 6,115,552 A | * 9/2000 | Kaneda | ......................... 396/82 |
| 2003/0030920 A1 | 2/2003 | Okawara | ..................... 359/823 |

* cited by examiner

Primary Examiner—David M. Gray
(74) Attorney, Agent, or Firm—Fitzpatrick, Cella, Harper & Scinto

(57) ABSTRACT

A lens control apparatus with which a lens can be moved accurately to a target position is disclosed. The lens control apparatus comprises a position sensor that outputs a detection signal that changes periodically in accordance with a movement of the lens; a first calculation unit that calculates a differential value between a phase component of position detection data that have been obtained based on a detection signal of the position sensor when the lens has been moved to a predetermined reference position and a phase component of position control data for controlling the position of the lens and corresponding to the reference position and a second calculation unit that calculates the target position in the position control data based on the position detection data and the differential value.

9 Claims, 14 Drawing Sheets

FIG.13
(PRIOR ART)

FOCUS LENS POSITION $\infty \leftarrow \rightarrow$ CLOSE RANGE    A(n, v)

ZOOM LENS POSITION: WIDE ↑ ↓ TELE

| n / v | 0 | 1 | 2 | 3 | ---- | k | ---- | m |
|---|---|---|---|---|---|---|---|---|
| 0 | A00 | A10 | A20 | A30 | ---- | Ak0 | ---- | Am0 |
| 1 | A01 | A11 | A21 | A31 | ---- | Ak1 | ---- | Am1 |
| 2 | A02 | A12 | A22 | A32 | ---- | Ak2 | ---- | Am2 |
| 3 | A03 | A13 | A23 | A33 | ---- | Ak3 | ---- | Am3 |
| ⋮ | ⋮ | ⋮ | ⋮ | ⋮ | ⋮ | ⋮ | | ⋮ |
| k | A0k | A1k | A2k | A3k | ---- | Akk | ---- | Amk |
| ⋮ | ⋮ | ⋮ | ⋮ | ⋮ | ⋮ | ⋮ | | ⋮ |
| s | A0s | A1s | A2s | A3s | ---- | Aks | ---- | Ams |

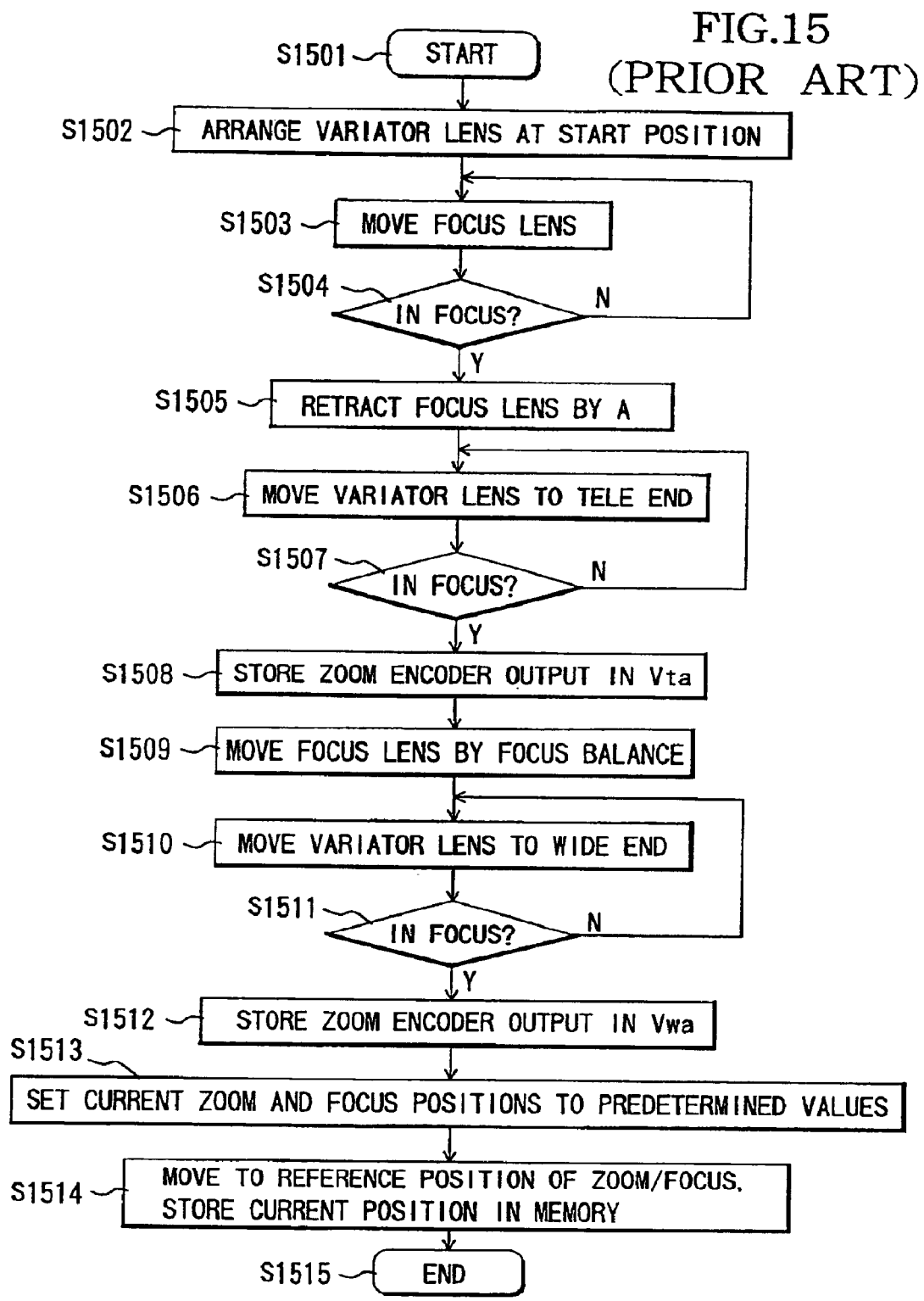

LENS CONTROL APPARATUS, LENS CONTROL METHOD AND CAMERA

BACKGROUND OF THE INVENTION

1. Field of the Invention

The present invention relates to lens control methods using a positional sensor, such as a magnetic resistance (MR) element or an optical sensor, that are applied to focus adjustment in optical systems, as well as lens control apparatuses and cameras provided with the same.

2. Description of Related Art

In cameras with integrated lens, there is a need for miniaturization, and for making it possible to take images at positions as close as possible in front of the lens. Therefore, inner focus type lenses are now mainstream in which the compensation lens and the zoom lens are not coupled mechanically by a cam, but the trajectory over which the compensation lens is to be moved is stored in advance as lens cam data in a controller, the compensation lens is driven in accordance with this lens cam data, and the focus is also adjusted with this compensation lens.

FIG. 9 shows a simple configuration of a lens system of the inner focus type. In FIG. 9, numerical reference 901 denotes a fixed first lens unit, numerical reference 902 denotes a second lens unit for zooming (referred to in the following as "zoom lens"), numerical reference 903 denotes a diaphragm for regulating the light amount. Numerical reference 904 denotes a fixed third lens unit, numerical reference 905 denotes a fourth lens unit (referred to as "focus lens" in the following) that is provided with both a focus adjustment function as well as a function for compensating the shifting of the focus plane due to the zooming (compensation function), and numerical reference 906 denotes an image-pickup plane at an image-pickup element, such as a CCD.

As is well-known in the art, with the lens system configured as shown in FIG. 9, since the focus lens 905 is provided with both a compensation function as well as a focus adjustment function, the position of the focus lens 905 for focusing on the image-pickup plane 906 differs depending on the object distance, even for the same focal length. Continuously plotting the positions of the focus lens 905 for focusing on the image-pickup plane against the focal length for a variety of object distances results in the graph shown in FIG. 10. Zooming without image blur is possible if the cam trajectory corresponding to the object distance is chosen from the plurality of cam trajectories shown in FIG. 10, and the focus lens 905 is moved along this cam trajectory, In lens systems of the front lens focus type, a focus lens that is independent from the zoom lens is provided, and the zoom lens and the focus lens are coupled via a mechanical cam ring. Consequently, if for example a knob for manual zooming is provided on the cam ring, and the focal length is changed by hand, the cam ring rotates while following this movement, and the zoom lens and the focus lens move along a cam groove of the cam ring, regardless of how fast the knob is moved. Thus, if the focus lens is precisely in focus, then image blur does not occur due to this operation.

On the other hand, in the control for a lens system of the inner focus type, it is common that the data for a plurality of cam trajectories as shown in FIG. 10 are stored in some form (this may be data indicating the cam trajectories themselves or it may be a function of the lens position), the cam trajectory is selected on the basis of the position of the focus lens and the zoom lens, and zooming is performed while following the selected cam trajectory.

FIG. 11 is a graph illustrating an example of a conventional method for tracking the cam trajectory. In FIG. 11, $Z_0$, $Z_1$, $Z_2$, ..., $Z_6$ denote zoom lens positions, and $a_0$, $a_1$, $a_2$, ..., $a_6$ and $b_0$, $b_1$, $b_2$, ..., $b_6$ denote representative cam trajectories that have been stored in advance in the controller. Furthermore, $p_0$, $p_1$, $p_2$, ..., $p_6$ are cam trajectories that are calculated from these two cam trajectories (i.e. the cam trajectories indicated as a and b). The equation for calculating the cam trajectory is as follows:

$$p(n+1)=|p(n)-a(n)|/|b(n)-a(n)|\times|b(n+1)-a(n+1)|+a(n+1) \quad \text{Eq. (1)}$$

According to Equation (1), for example, if the focus lens is at the position $p_0$ in FIG. 11, the ratio at which $p_0$ divides the segment $b_0-a_0$ is determined, and p1 is set to the point that divides the segment $b_1-a_1$ at the same ratio. The speed at which the focus lens needs to be moved to maintain focus can be obtained from the difference between the focus lens positions, that is, $p_1-p_0$, and the time required for moving the zoom lens from $Z_0$ to $Z_1$.

The following is an explanation of the case that the stop positions of the zoom lens are not equal to the boundary positions ($Z_0$ ... $Z_6$ in FIG. 11) of the data of representative cam trajectories that have been stored in advance. FIG. 12 is a graph illustrating a method for interpolating the zoom lens position, in which a portion of the cam trajectories shown in FIG. 11 has been extracted, and the zoom lens position can be set freely.

In FIG. 12, the vertical axis marks the focus lens position, and the horizontal axis marks the zoom lens position. As for the positions of the representative cam trajectories (focus lens position vs. zoom lens position) stored in the lens controller, when $Z_0$, $Z_1$, ..., $Z_{k-1}$, $Z_k$ ... $Z_n$ are the zoom lens positions, then the focus lens positions for different object distances are as follows:

$$a_0, a_1, \ldots, a_{k-1}, a_k, \ldots, a_n$$

$$b_0, b_1, \ldots, b_{k-1}, b_k, \ldots, b_n$$

When the zoom lens position is a $Z_x$ that is not on the zoom boundaries ($Z_{k-1}$, $Z_k$) and the focus lens position is $P_x$, then the following Equations (2) and (3) are used to calculate $a_x$ and $b_x$:

$$a_x=a_k-(Z_k-Z_x)\times(a_k-a_{k-1})/(Z_k-Z_{k-1}) \quad \text{Eq. (2)}$$

$$b_x=b_k-(Z_k-Z_x)\times(b_k-b_{k-1})/(Z_k-Z_{k-1}) \quad \text{Eq. (3)}$$

That is to say, the divisional ratio is determined based on the current zoom lens position and the two zoom boundary positions ($Z_k$ and $Z_{k-1}$ in FIG. 12) that are at the both sides of the current zoom lens position. Then, $a_x$ and $b_x$ can be determined by dividing internally the position data ($a_k$ and $a_{k-1}$ as well as $b_k$ and $b_{k-1}$) that have the same object distance from the four position data ($a_k$, $a_{k-1}$, $b_k$ and $b_{k-1}$ in FIG. 12) of the recorded representative cam trajectories with the divisional ratio.

Moreover, $p_k$ and $p_{k-1}$ can be determined by dividing internally the position data ($a_k$ and $b_k$ as well as $a_{k-1}$ and $b_{k-1}$) that have the same focal length ($Z_k$ and $Z_{k-1}$ in FIG. 12) from the four position data ($a_k$, $a_{k-1}$, $b_k$ and $b_{k-1}$ in FIG. 12) of the recorded representative cam trajectories with the divisional ratio obtained from $a_x$, $p_x$ and $b_x$, as in Equation (1).

Then, when zooming from the wide side to the tele side, the speed at which the focus lens needs to be moved to maintain focus can be obtained from the difference between the focus position $p_k$ serving as the target and the current focus position $p_x$, and the time that is necessary for moving the zoom lens from $Z_x$ to $Z_k$.

Moreover, when zooming from the tele side to the wide side, the speed at which the focus lens needs to be moved to maintain focus can be obtained from the difference between the focus position $p_{k-1}$ serving as the target and the current focus position $p_x$, and the time that is necessary for moving the zoom lens from $Z_x$ to $Z_{k-1}$. The above-described method for tracking a cam trajectory has been proposed in the related art.

FIG. 13 shows an example of a table of cam trajectory data that is stored in advance in the controller. FIG. 13 shows data A(n, v) for a focus lens position that changes in accordance with the object distance and the zoom lens position. The variable n denotes the change in object distance, and the variable v denotes the change in zoom lens position (focal length). Here, n=0 represents an object distance of infinity, and as n becomes larger, the object distance changes towards close range, and n=m indicates an object distance of 1 cm. On the other hand, v=0 represents the wide end, and as variable v becomes larger, the focal length gets longer, and v=s represents the zoom lens position at the tele end. Consequently, one column of data in the table shown in FIG. 13 traces on a cam trajectory.

The data of the cam trajectories in FIG. 13 are based on optical design values, and are produced as zoom tracking data, but in actual lenses, due to discrepancies in the focal length between individual lens units, the cam trajectories do not necessarily take on the design values. Consequently, in order to track the cam trajectories without image blur, as described above, it is necessary to match the trajectories over which the actual lens moves with the coordinate axis (cam trajectory) of the data in the table.

In actual video cameras, the task is performed of adjusting to which zoom lens position of the stored cam trajectory data the tele end and the wide end correspond.

The following method is known as a focus adjustment method. The difference (focus balance) between the in-focus positions of the focus lens at the tele end and at the wide end is taken as the design value. Then, the zoom lens position is determined such that the shift amount between focus lens position at the tele end and the focus lens position in the middle (intermediate focal length) at which the focus lens is furthest up in a map (FIG. 14 explained below) becomes the design value, and the zoom lens positions at the tele end and the wide end are decided.

This is explained in more detail using FIG. 14. FIG. 14 shows a cam trajectory Sa at a predetermined object distance. Here, the horizontal axis marks the zoom lens position (that is, the focal length), and the vertical axis denotes the focus lens position. With this cam trajectory Sa (for example the cam trajectory for when the object distance is ∞), the difference of the in-focus position of the focus lens at the tele end T and the wide end W is assumed to be zero for the sake of simplicity. Point (1) is taken to be the starting point for the adjustment, and from this point, the focus lens position is reduced in downward direction in the drawing for an amount corresponding to the design value A of the focus balance (position (2)). From this situation, the zoom lens is moved in one direction (to the right in FIG. 14), and takes on the position indicated as (3) when the in-focus position is determined, and this is taken as the zoom lens position Ta at the tele end. The slope of the cam trajectory near the tele end is steep, so that the difference between position (1) and position (3) will be close to the design value.

With the operation up to this point, the focus lens position and the zoom lens position on the actual cam trajectory for which the focal length difference of position (1) and position (2) and the zoom distance difference of position (1) and position (3) fit the design values can be determined. Next, the lens position that fits the designed cam trajectory at the wide end is determined. In this example, the difference of the focus lens positions at the wide end and the tele end is zero, as mentioned above, so that the position (4) at which the zoom lens is similarly moved in the other direction (to the left in FIG. 14), and in-focus is attained becomes the zoom lens position Wa at the wide end. By setting the focus lens position and the zoom lens position at position (4) as the values for the wide end in the table data (FIG. 13) of the cam trajectories stored in the controller, the point of origin for the actual lens trajectories and the ideal trajectories can be matched and zooming without image blur can be achieved.

Ta in FIG. 14 corresponds to the zoom lens position for v=s in the table data (FIG. 13), and Wa corresponds to the zoom lens position for v=0. If the cam trajectory Sa is the trajectory for an object distance of ∞, then position (4) corresponds to A(0, 0) in the table data. With this method for adjusting the cam trajectories, the adjustment is made by fixing the focus lens positions to the design positions and varying the zoom lens positions, so that the stroke of the zoom lens will differ depending on the individual adjusted lenses. Image blur can be prevented by adjusting the displacement amount of the zoom lens for the updated variables v in the table data in FIG. 13.

FIG. 15 shows an algorithm for the case that the focus adjustment is carried out by adjustment software using a controller. The procedure starts at step (abbreviated to "S" below) 1501. At S1502, the position of the zoom lens on the optical axis is set to a start position (position (1) in FIG. 14) corresponding to a position near the peak of the trajectory of the focus lens (cam trajectory).

At S1503, focusing is performed by moving the focus lens with a focus motor. It should be noted that the object distance is set to an adjustment distance (here, it is set to ∞), and an object such as a chart for adjustment is arranged. At S1504, it is checked whether focusing has been achieved, and the focus lens is moved until it is in focus. For the actual focusing, an auto-focus (AF) function is used, and the in-focus position is sought by detecting the position of the focus lens at which the AF evaluation value becomes maximal.

If it has been confirmed at S1504 that focusing has been established, then the focus lens is moved by the design value A for that lens (the position of the focus lens is moved downward in FIG. 14, whereas in actuality it may be moved out toward the object or moved in toward the image plane, depending on the zoom type of the zoom lens). At S1506, the zoom lens is moved from this state toward the tele end T. At the same time, it is judged at S1507 whether an in-focus state has been attained. When the movement of the zoom lens has terminated and an in-focus state has been attained, then the position of the zoom lens corresponds to the zoom lens position (Ta) at the tele end. Then, at S1508, the position of the zoom encoder in that state is stored in $V_{ta}$ as the value that defines the tele end position. At S1509, the focus lens is moved in the optical axis direction for a distance corresponding to the above-mentioned focus balance.

However, if the focus balance is 0 as in FIG. 14, then it is not necessary to move the focus lens. At S1510 and S1511, the zoom lens position (Wa) for the wide end reference is determined by moving the zoom lens to the wide end, similar to the determination of the tele end (Ta) in S1506 and S1507. At S1512, the position of the zoom encoder in the zoom lens position Wa is stored in $V_{wa}$ as the zoom lens position at the wide end. At S1513, the origin (A00) of the table data in FIG. 13 is rewritten to the focus lens position and the zoom lens position in the in-focus state at the wide end. At S1514, the distance from the origin position to a reference position, such as the reset sensor position or the mechanical limit, is measured, and the focus lens position and the zoom lens position at the reference position are stored as adjustment values. The adjustment is terminated at S1515.

When the power of the camera is turned on, an initialization operation is executed in which the reference position is sought through the above-described process and rewritten to the current lens position (adjustment value) at the time when the lens has been moved to the reference position. With this initialization operation, the positions of the origin of the actual lens trajectory and the table data stored in advance in the controller are matched. Thus, a zooming operation without image blur can be achieved with the method for tracking the cam trajectory described in FIG. 11 while sequentially reading the table data when moving the zoom lens.

In recent years, as image-pickup elements, such as CCDs, become smaller and the number of pixels increases, the need for positional accuracy of the focus lens increases, and cameras have reached the market in which linear motors, such as highly accurate voice coil motors, are used as the actuator for driving the focus lens. In systems using linear motors, MR sensors and magnets that are magnetized at predetermined pitch are used as focus position sensors, and highly accurate position detection is now ordinarily performed by performing an excision process, such as interpolation of output signals of multiple phases that are output from the MR element.

Conventionally, with position detection apparatuses using an MR element, position detection is performed by selecting a phase having a signal component with excellent linearity from sine-shaped signal components with a plurality of phases that are output from the MR element and performing a calculation of interpolating this signal component.

In such position detection methods using an MR element or the like, the detection signal is a combination of a phase component of a sine wave and a wave number component of a sine wave, due to the interpolation process. That is to say, the component corresponding to the wave number is an incremental component, so that it is necessary to settle the origin position by some kind of resetting process. On the other hand, the phase component is an absolute position component that is settled with one cycle of a sine wave.

As described above, in a position detection system combining an absolute position component and a relative position component, if an initialization operation is performed in which the lens is moved to the reference position when the power is turned on, and the current position of the lens is rewritten as an adjustment position, then the relative position component, which corresponds to the wave number component, needs to be reset, but the absolute position component, which corresponds to the phase component, is decided unequivocally, so that it cannot be reset.

Consequently, when gain and offset of the MR element output to be adjusted change due to output variations caused by electrical variations in the signal output of the MR element and changes in the ambient temperature, then the result is that the lens position data that are obtained from the detection signal by an interpolation process fluctuate each time the initialization operation is performed, even though the lens is mechanically at the same position.

This fluctuation amount results in a displacement of the origin in the table data of the cam trajectories stored in advance in a controller or the like, so that errors occur during the tracking of the cam trajectory when actually zooming, resulting in image blur and out of focus.

SUMMARY OF THE INVENTION

It is an object of the present invention to provide a lens control apparatus detecting the position of a lens by combining an absolute position component and a relative position component of a detection signal that is output in response to a movement of the lens on the optical axis, wherein the lens can be moved accurately to the desired position even when there is a discrepancy in the actually detected position caused by output variations of the detection signal due to changes in ambient temperature or the like, as well as such a lens control method and a camera.

To achieve this object, lens control apparatus being one aspect in accordance with the present invention includes a position sensor that outputs a detection signal that changes periodically in accordance with a movement of the lens, a first calculation unit that calculates a differential value between a phase component of position detection data that have been obtained based on a detection signal of the position sensor when the lens has been moved to a predetermined reference position and a phase component of position control data for controlling the position of the lens and corresponding to the reference position, a second calculation unit that calculates the target position in the position control data based on the position detection data and the differential value, and a control circuit that outputs the driving signal based on the differential value and the target position in the position control data.

It is preferable that the position sensor comprises a magnet member that is periodically magnetized, and a magnetic detector that moves relative to the magnet member when the lens is moved and that outputs a plurality of the position detection signals having different phases, in response to magnetic changes due to that movement.

It is preferable that the position sensor comprises an optical scale member having a reflection surface whose shape changes periodically, and an optical detector that moves relative to the optical scale member when the lens is moved and that outputs a plurality of the position detection signals having different phases, in response to a received light amount among light that has been projected to and reflected by the scale member, which changes due to the movement.

These and further objects and features of the lens control apparatus, lens control method and camera being one aspect of the present invention will become apparent from the following detailed description of preferred embodiments thereof taken in conjunction with the accompanying drawings.

BRIEF DESCRIPTION OF THE DRAWINGS

FIG. 13 shows a table of focus lens position data, for different object distances, that change with the zoom lens position.

FIG. 15 is a flowchart illustrating an algorithm for the case that the focus adjustment is carried out by adjustment software using a controller.

DETAILED DESCRIPTION OF THE PREFERRED EMBODIMENTS

Figure 1:
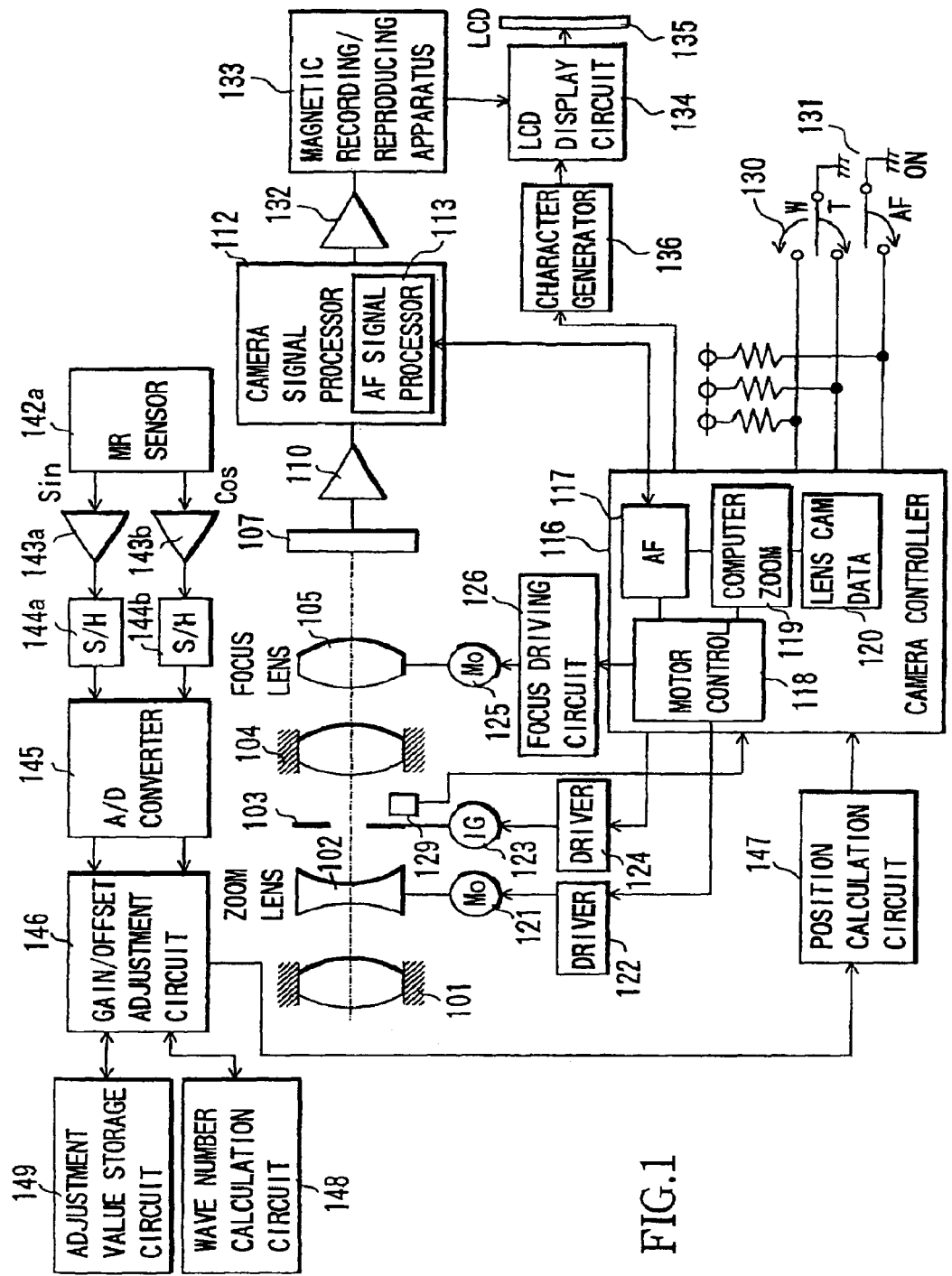
FIG. 1 is a block diagram illustrating the configuration of a lens control apparatus in accordance with an embodiment of the present invention.

The following is a description of a lens control apparatus in accordance with an embodiment of the present invention. FIG. 1 is a block diagram illustrating the configuration of a lens control apparatus in accordance with this embodiment. FIG. 1 shows an example in which a stepping motor that does not need a position sensor is used as an actuator (driving unit) for driving the zoom lens, and a linear motor is used as an actuator for driving the focus lens. In this embodiment, an MR sensor is used for detecting the position of the focus lens. This lens control apparatus outputs a driving signal for moving the focus lens to a target position. The MR sensor serves as a position sensor that outputs a detection signal including an absolute position component and a relative position component, in accordance with the movement of the focus lens on the optical axis.

In FIG. 1, numerical reference 101 denotes a fixed first lens unit, numerical reference 102 denotes a second lens unit for zooming (referred to in the following as "zoom lens"), which can move on the optical axis (i.e. to the left and right in FIG. 1). Numerical reference 103 denotes a diaphragm for regulating the light amount, numerical reference 104 denotes a fixed third lens unit, numerical reference 105 denotes a fourth lens unit (referred to as "focus lens" in the following), which can move on the optical axis and is provided with both a focus adjustment function as well as a compensation function for compensating the shifting of the focus plane due to the zooming. The light from the object passes through the lens units 101, 102, 104, 105 and the diaphragm 103, and is imaged onto an image-pickup element 107, such as a CCD. The image that has passed through these lens units and is imaged on the image-pickup element 107 is converted photo-electrically, and an image-pickup signal that is output from the image-pickup element 107 is input into a camera signal processing circuit 112 after having been amplified to a suitable level by an amplifier 110, and converted into a standard television signal. This standard television signal is amplified to a suitable level by an amplifier 132, and sent to a magnetic recording/reproducing apparatus 133 as well as sent to an LCD display circuit 134, and the picked-up image is displayed on an LCD 135.

A camera controller 116 (a first calculation unit, a second calculation unit) serving as a control circuit drives the diaphragm 103 via a diaphragm driving unit 123 by sending a signal to a driver 124. Thus, the aperture diameter of the diaphragm can be changed, and based on the output from the sensor 129, it can be decided whether a predetermined aperture diameter has been reached.

It should be noted that the LCD 135 also displays messages for the camera operator, such as the imaging mode or imaging state, or warning messages. Here, the camera controller 116 controls a character generator 136, and by mixing the output signal from the character generator 136 and the picked up image signal with the LCD display circuit 134, the imaging mode or the like can be displayed overlaying the picked up image. Moreover, the image-pickup signal that is input into the camera signal processing circuit 112 is input at the same time into an AF signal processing circuit 113. An AF evaluation value generated by the AF signal processing circuit 113 is read out by the camera controller 116.

The camera controller 116 reads whether a zoom switch 130 and an AF switch 131 are on or off. When the AF switch 131 is off and the zoom switch 130 is pressed, then a computer zoom program 119 sends a signal to a zoom motor driver 122 based on lens cam data 120 stored in advance in the camera controller 116 so as to move the zoom lens 102 in the direction in which the zoom switch 130 is pressed (tele direction or wide direction). Thus, the zoom lens 102 is moved by the zoom motor 121. At the same time, the camera controller 116 sends a signal to the focus driving circuit 126, and moves the focus lens 105 through a focus motor 125. Thus, the zoom operation is carried out by driving the zoom lens 102 and the focus lens 105.

On the other hand, when the AF switch 131 is on and the zoom switch 130 is pressed, it is necessary to maintain the in-focus situation. Therefore, the computer zoom program 119 references not only the lens cam data 120 stored in advance in the camera controller, but also the AF evaluation value sent to the camera controller 116, in order to perform a zoom operation while maintaining the lens position at which the AF evaluation value becomes maximal.

When the AF switch 131 is on and the zoom switch 130 is not pressed, then an AF program 117 sends a signal via a motor control circuit 118 to the focus driving circuit 126 such that the AF evaluation value sent from the camera signal processing circuit 112 becomes maximal. Then, an auto-focus control is carried out by moving the focus lens 105 via the focus motor 125.

The position of the focus lens 105 is detected based on the output of an MR sensor 142*a*.

Figure 2:
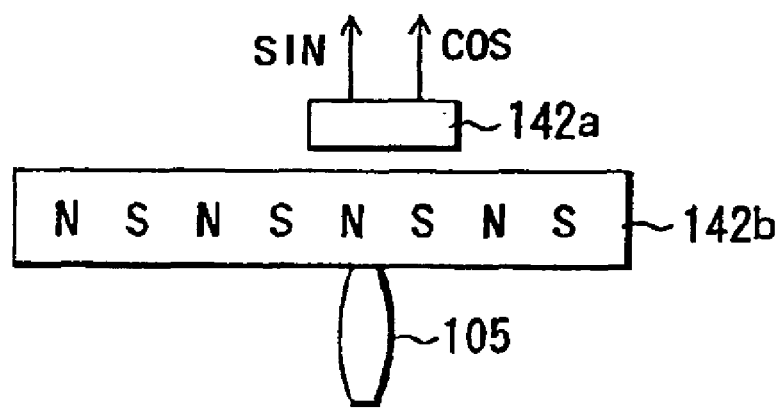
FIGS. 2(A) and 2(B) are diagrams showing configurations outputting a detection signal in response to a movement of the focus lens.
Figure 2:
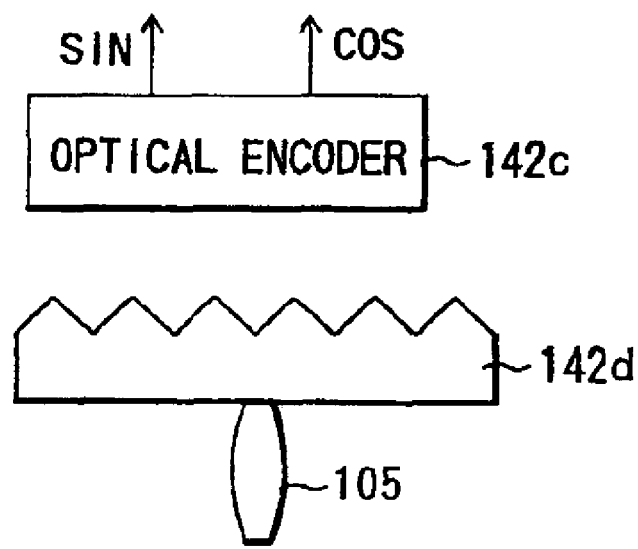

As shown in FIG. 2(A), a detection magnet 142*b* extends in the direction in which the focus lens 105 is moved, and is magnetized in a predetermined pattern with alternating inverse polarities (N and S). The MR sensor 142*a* is arranged at a location in opposition to the detection magnet 142*b*, with a predetermined gap between them.

Here, when the MR sensor 142*a* and the detection magnet 142*b* move relative to one another in response to moving the focus lens 105, a plurality of detection signals having different phases (two phases in this embodiment) are output from the MR sensor 142*a*.

The output (analog signal) from the MR sensor 142a is amplified by analog amplifiers 143a and 143b, passes through sample-and-hold circuits 144a and 144b, and is converted into a digital signal by an A/D converter 145. After the gain and the offset for the thus captured output from the MR sensor 142a have been adjusted by a gain/offset adjustment circuit 146, the lens position is calculated by a position calculation circuit 147. That is to say, the current position (actual position) of the focus lens on the optical axis is calculated based on an absolute position component and a relative position component of the detection signal output from the MR sensor 142a.

The lens position data obtained with the position calculation circuit 147 is sent to the camera controller 116, and used for the position control (servo control) of the focus lens 105. The camera controller 116 can control the driving of the focus motor 125 by applying a driving signal to the focus driving circuit 126. A wave number calculation circuit 148 calculates the position of the focus lens 105 at a given point in time in terms of the number of waves of the output from the MR sensor 142a by counting from a reference position.

Figure 6:
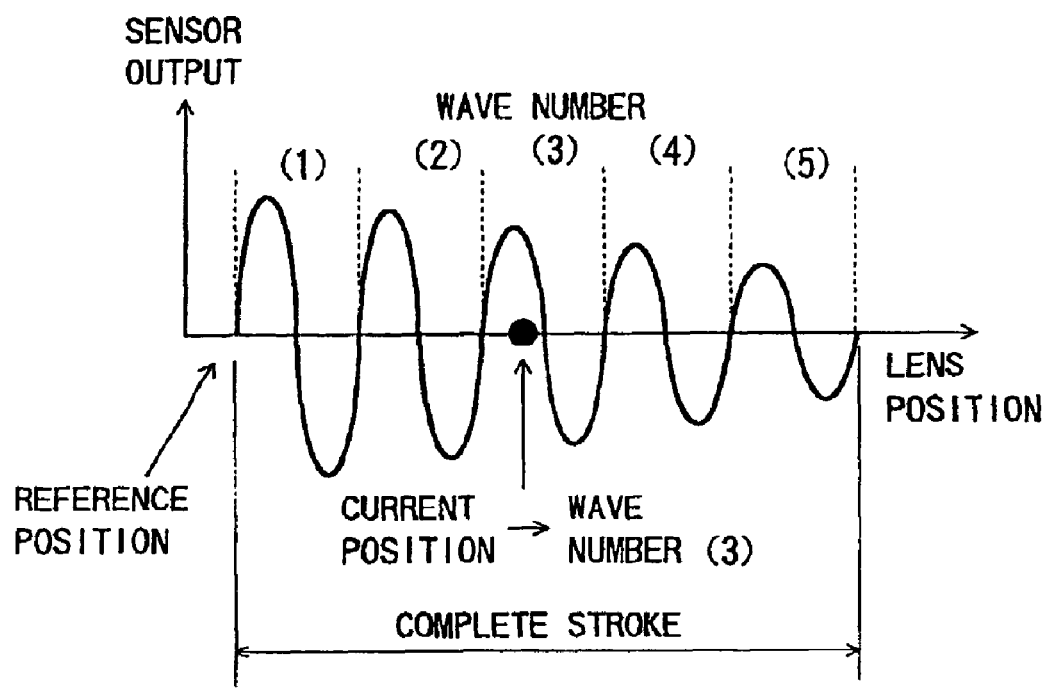
FIG. 6 is a graph illustrating the adjustment of gain and offset of the detection signals that are output from the MR sensor.

For example, if the focus lens 105 is at the position of the black circle in FIG. 6, the wave number calculation circuit 148 determines that the focus lens 105 is at the third wave. An adjustment value storage circuit 149 stores for each wave certain data (adjustment data) for adjusting the gain and offset for the output of the MR sensor 142a.

Figure 3:
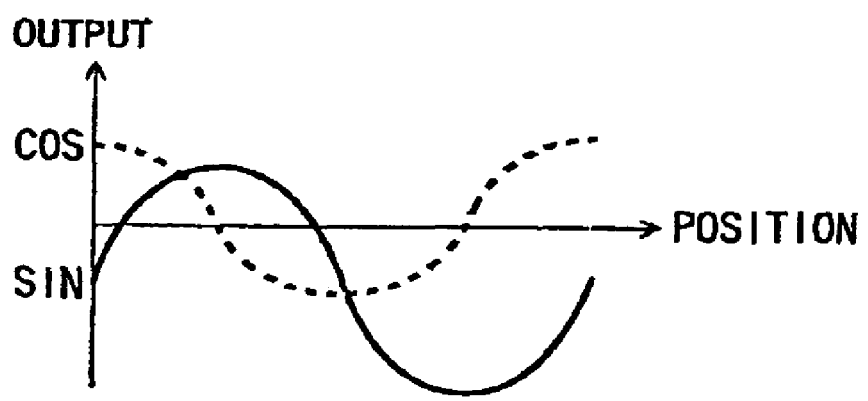
FIG. 3 is a graph illustrating the adjustment of gain and offset of the detection signals that are output by the MR sensor.
Figure 4:
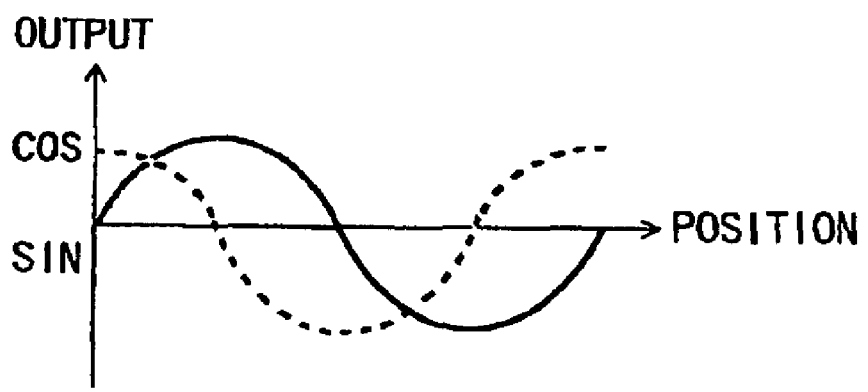
FIG. 4 is a graph illustrating the adjustment of gain and offset of the detection signals that are output by the MR sensor.

As shown in FIG. 3, the amplitudes and the levels of the amplitude center of the detection signals with a plurality of phases that are output from the MR sensor 142a generally differ depending on such factors as assembly differences of the sensors or differences in the electrical properties of the circuits in the individual products, as well as temperature changes or changes in the lens speed when using the individual products. In order to maintain a highly accurate lens position detection, it is necessary to adjust the gain and the offset such that amplitude and amplitude center match, as shown in FIG. 4.

That is to say, the focus lens 105 whose position is to be measured is moved for at least one period of the sine wave output of the MR sensor 142a, and the gain and offset adjustment values are determined from the maximum and minimum of the sensor output that has been captured with the A/D converter, for example. Then, gain and offset are adjusted, by processing the data of the sensor output that has been captured with the A/D converter 145, such that the amplitude and the amplitude center match.

More specifically, when MAX is the maximum of the MR sensor output and MIN is its minimum, then the adjustment values GAIN and OFFSET can be calculated as shown in Equations (4) and (5), wherein RANGE is the dynamic range of the data after adjustment:

$$GAIN = \frac{RANGE}{MAX - MIN} \qquad Eq.\ (4)$$

$$OFFSET = \frac{MAX + MIN}{2} \qquad Eq.\ (5)$$

The gain/offset adjustment circuit 146 obtains the wave number at the present position of the focus lens 105 from the wave number calculation circuit 148, and retrieves the adjustment data corresponding to this wave number from the adjustment value storage circuit 149. Then, using the adjustment data, an MR sensor output (OUTPUT) with adjusted gain and offset is obtained from the following Equation (6). Here, MR is an actual output signal of MR sensor.

$$OUTPUT = (MR - OFFSET) \times GAIN \qquad Eq.\ (6)$$

Figure 7:
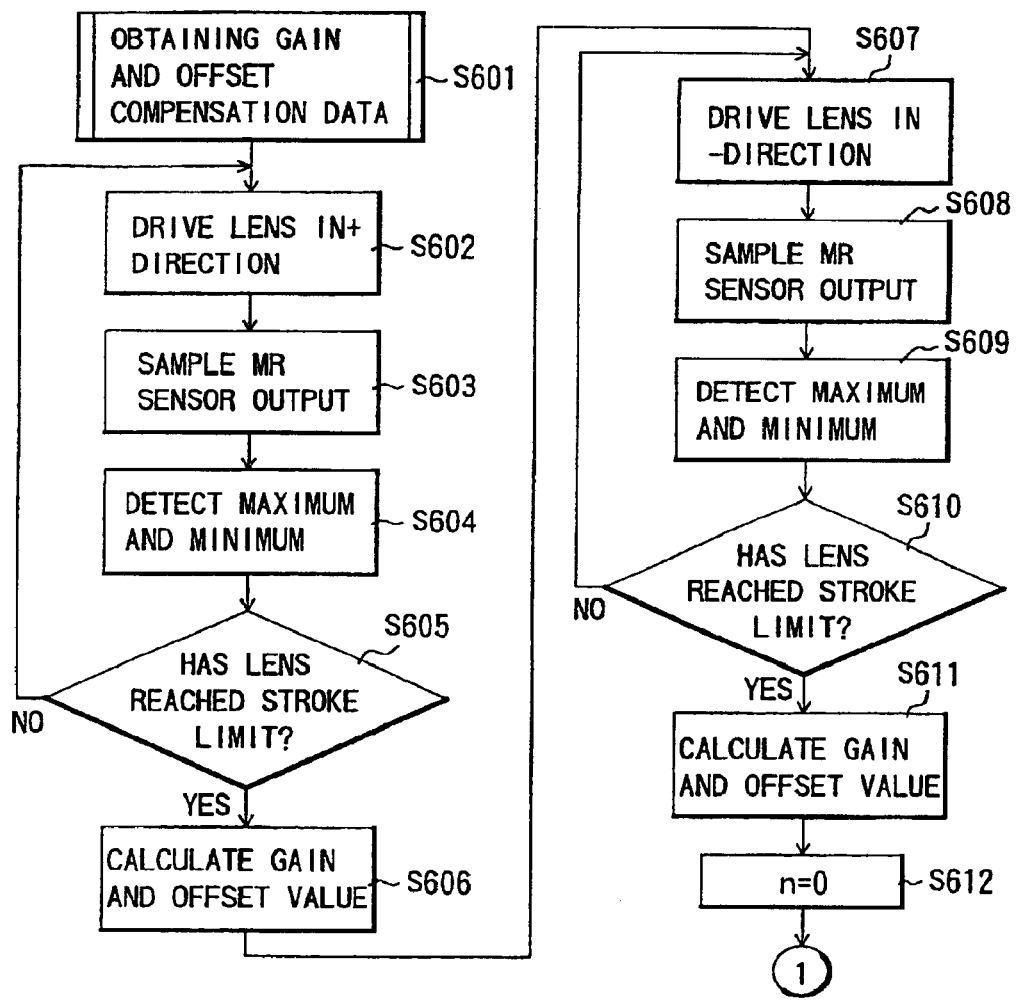
FIGS. 7(A) and 7(B) are flowcharts illustrating the process for detecting the position of the lens.
Figure 7:
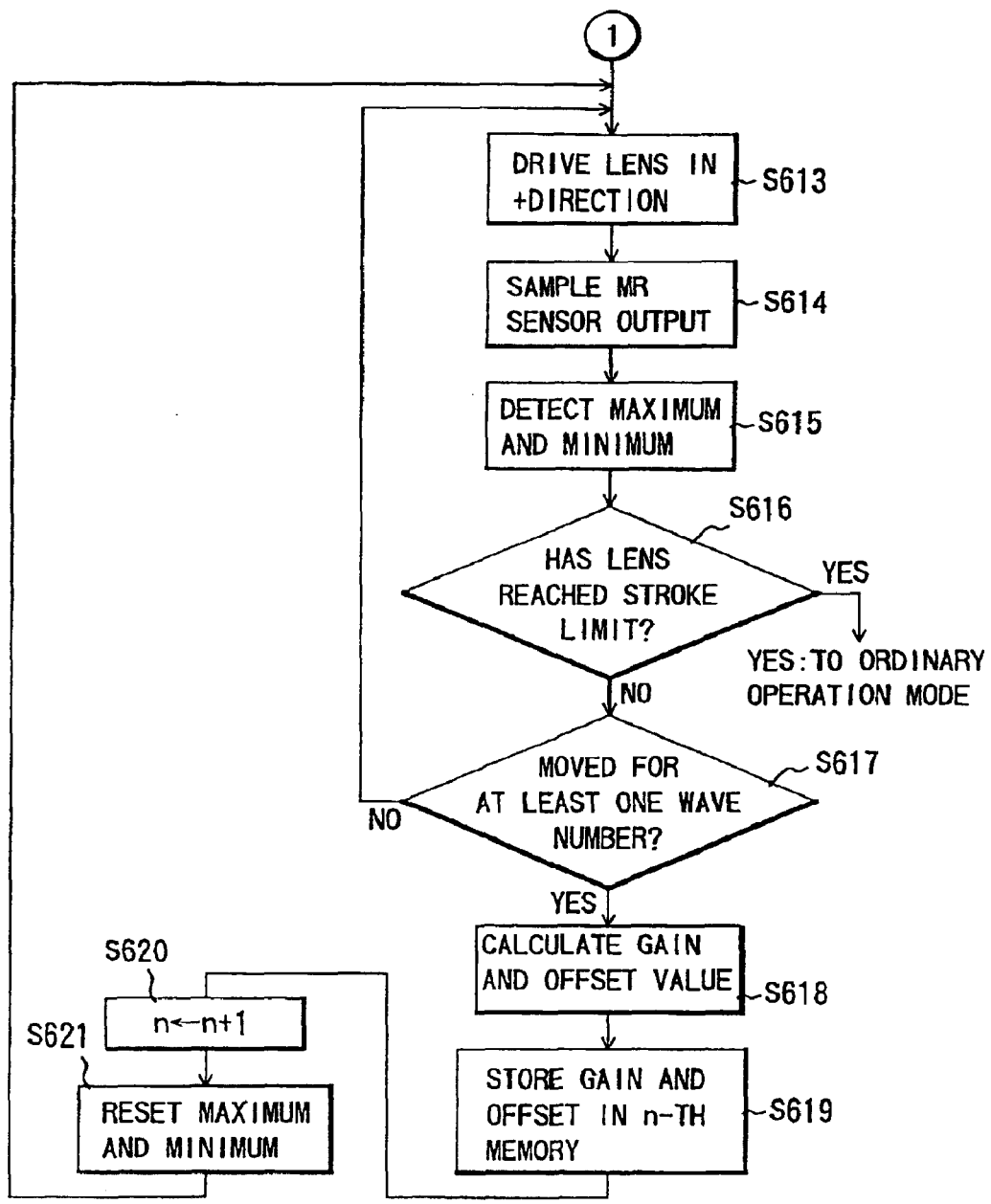

Referring to the flowchart in FIGS. 7(A) and 7(B), the following is an explanation of the process for determining the adjustment values corresponding to the individual waves of the sensor output for a complete stroke. This process is a lens initialization operation that is carried out, for example, when the power of the lens control apparatus of this embodiment is turned on, and is executed before the lens unit is moved to a predetermined position. This embodiment is explained for the case that the predetermined position is the mechanical limit of the focus lens 105. It should be noted that the following process is performed for each of the plurality of detection signals that are output from the MR sensor 142a.

First, in order to obtain an approximate adjustment value for the servo control of the focus lens 105, a signal driving the focus lens 105 in positive direction is sent from the focus driving circuit 126 to the focus motor 125 in step S602. Then, at S603 and S604, the maximum and the minimum of the MR sensor output are detected while the focus lens 105 is being moved.

At S605, it is judged whether the focus lens 105 has reached the stroke limit. If the focus lens 105 has reached the stroke limit, then, at S606, the gain and offset values are calculated from the maximum and minimum detected at S604, and stored. Here, whether the focus lens 105 has reached the stroke limit may be detected with an optical sensor or the like, or by judging whether a predetermined time has elapsed since the driving start.

Next, in order to return the focus lens 105 to the reference position, such as the mechanical limit, a signal driving the focus lens 105 in negative direction is sent from the focus driving circuit 126 to the focus motor 125 in step S607. Also in this situation, at S608 and S609, the maximum and the minimum of the MR sensor output are detected while the focus lens 105 is being moved. At S610, if it is judged that the focus lens 105 has reached the stroke limit (reference position), then, at S611, the gain and offset values are calculated from the maximum and minimum detected at S609, and stored. Here, whether the focus lens 105 has reached the reference position may be detected with an optical sensor or the like, or by judging whether a predetermined time has elapsed since the driving start.

Subsequently, the adjustment data are obtained for each wave. First, at S612, a wave number counter n is initialized to 0. Then, at S613, the focus lens 105 is moved in positive direction, and at S614 and S615, the maximum and minimum of the MR sensor output are detected while moving the focus lens 105. At S616, it is judged whether the focus lens 105 has reached the stroke limit while being moved, and if it has reached the stroke limit, the data acquisition is terminated and a transition to the ordinary control mode is made. If the focus lens 105 has not been reached the stroke limit, then, at S617, it is judged from the state of the MR sensor output whether the focus lens 105 has moved for an amount corresponding to at least one wave number. This judgement can be made for example by checking whether the output of the MR sensor 142a has changed from negative to positive.

If the focus lens 105 has not yet moved for an amount corresponding to one wave number, then the procedure returns to S613, and the detection of maximum and minimum is continued. On the other hand, if it is judged that the focus lens 105 has moved for an amount corresponding to at least one wave number, then, at S618, the gain and offset values are calculated from the maximum and minimum of the sensor output detected at this time, and the data are stored at S619 in the n-th storage area of the adjustment value storage circuit 149. The stored data may be the values of GAIN or OFFSET themselves, but it is also possible to store the maximum and minimum of the sensor output. In the latter case, the maximum and minimum are converted into the values of GAIN and OFFSET with the above-noted Equations (4) and (5) in the gain/offset adjustment process in the ordinary mode.

With the above-described process, the adjustment data for one wave is obtained, so that 1 is added to the wave number counter n at S620, and after the maximum and minimum of the sensor output have been reset at S621, the procedure returns to S613 and the above process is repeated for the next wave. This process is repeated until the focus lens 105 has reached the stroke limit.

It should be noted that this process is executed every time the power of the lens control apparatus is turned on or every time a reset is performed, and since the adjustment values are obtained each time the process is executed, it is possible to use a volatile medium, such as a DRAM, for the adjustment value storage circuit 149, which is advantageous with regard to costs.

Figure 5:
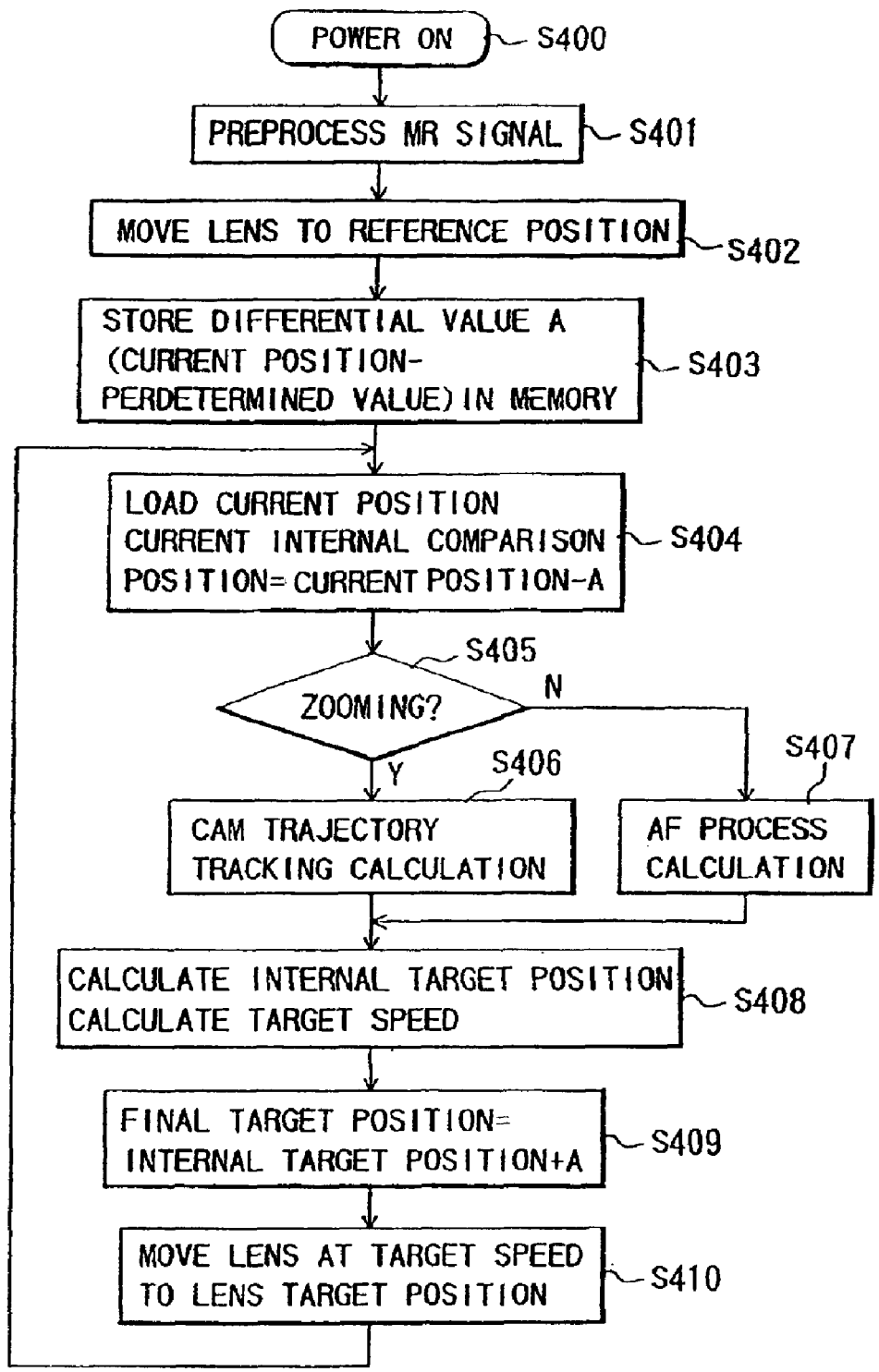
FIG. 5 is a flowchart illustrating the process for detecting the position of the lens.

When the process shown in FIGS. 7(A) and 7(B) has been performed and the values of GAIN and OFFSET have been determined for all wave numbers over the entire stroke, the focus lens 105 is returned to the reference position at the mechanical limit, and the process shown in FIG. 5 is carried out. At S400, the process starts, and then S401 is executed. The process shown in FIGS. 7(A) and 7(b) corresponds to S401 in FIG. 5.

Figure 14:
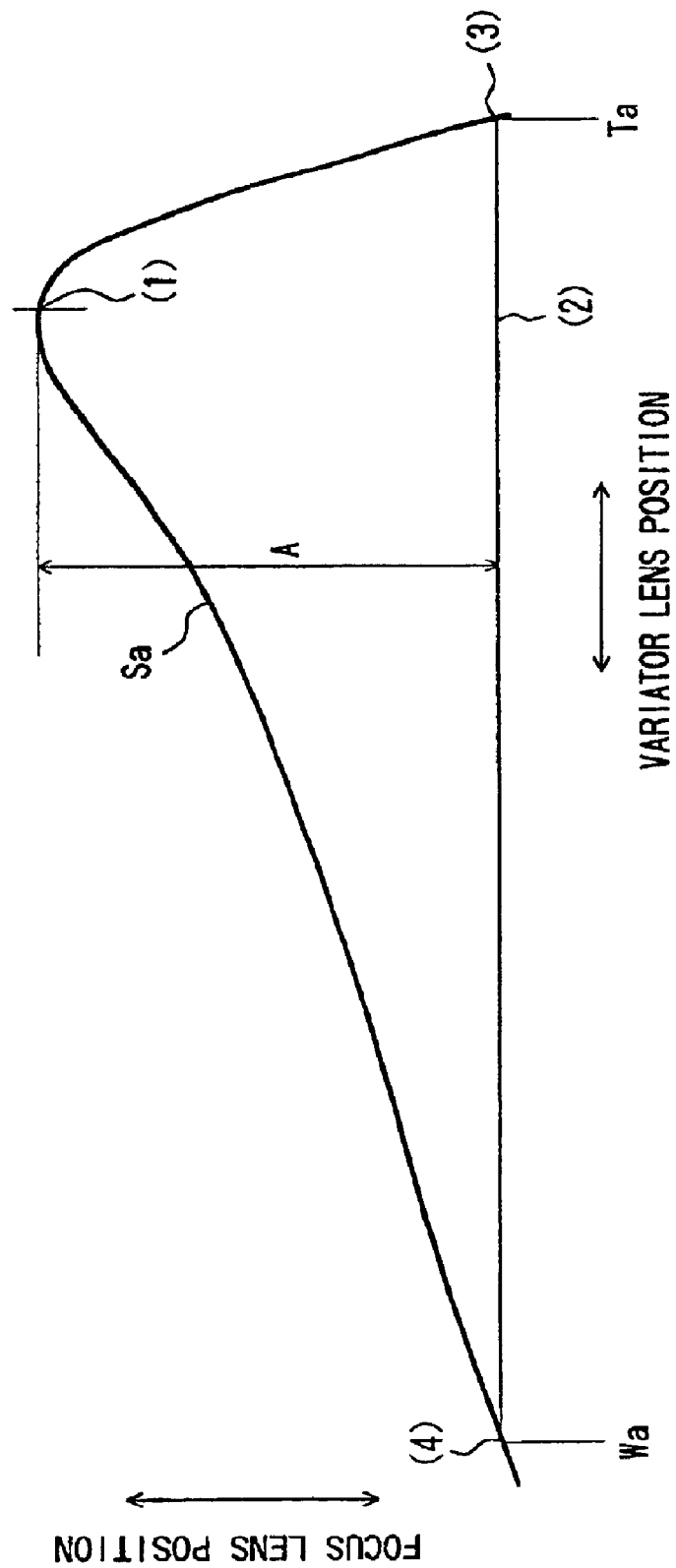
FIG. 14 is a graph illustrating the relation between a zoom lens position and a focus lens position.

Next, at S402, the focus lens 105 is moved to the reference position at the mechanical limit. This reference position corresponds to the reference position explained in FIGS. 14 and 15, to which the focus lens 105 is moved when the cam trajectory adjustment has been terminated. After the focus lens 105 has been moved to the reference position, only the wave number counter value (that is, the relative position component) of the MR sensor output is updated (initialized) in the values of the position data stored as the adjustment values (S1514 in FIG. 15). The phase component calculated by interpolation is not updated, because it is an absolute position component.

Then at S403, the current focus position data (position detection data) at the reference position, for which only the wave number component has been reset, are read in, and the displacement amount of the phase component as the differential value A to the adjustment value (position control data) determined at S1514, is stored in memory. That is to say, the process of a first calculation unit is performed, which calculates the differential value between an absolute position component (phase component in the position detection data) corresponding to the current position and the absolute position component (phase component in the position control data) corresponding to the reference origin position (in S1514 of FIG. 15, the position when the adjustment value was obtained)

Figure 8:
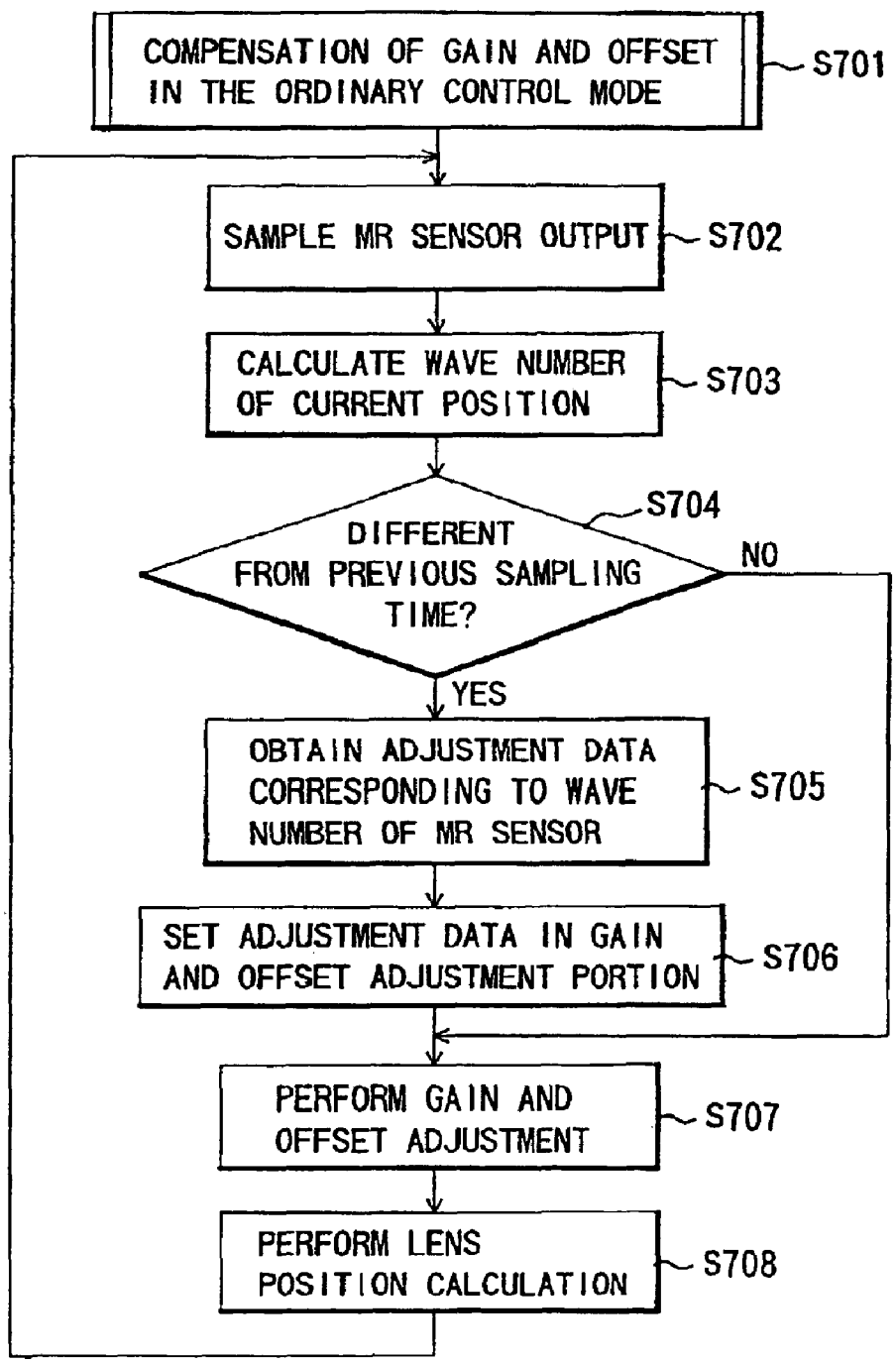
FIG. 8 is a flowchart illustrating the process for detecting the position of the lens.
Figure 9:
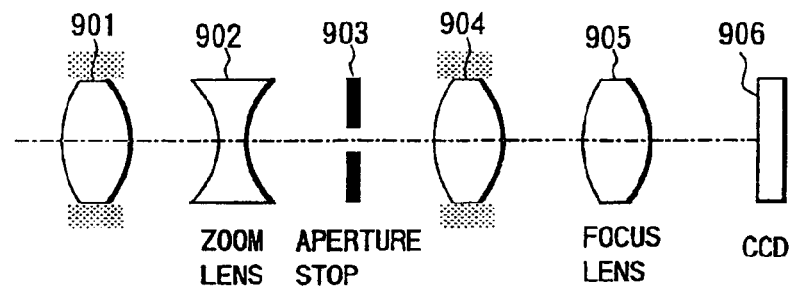
FIG. 9 is a diagram showing a simplified configuration of a conventional inner focus-type lens system.
Figure 10:
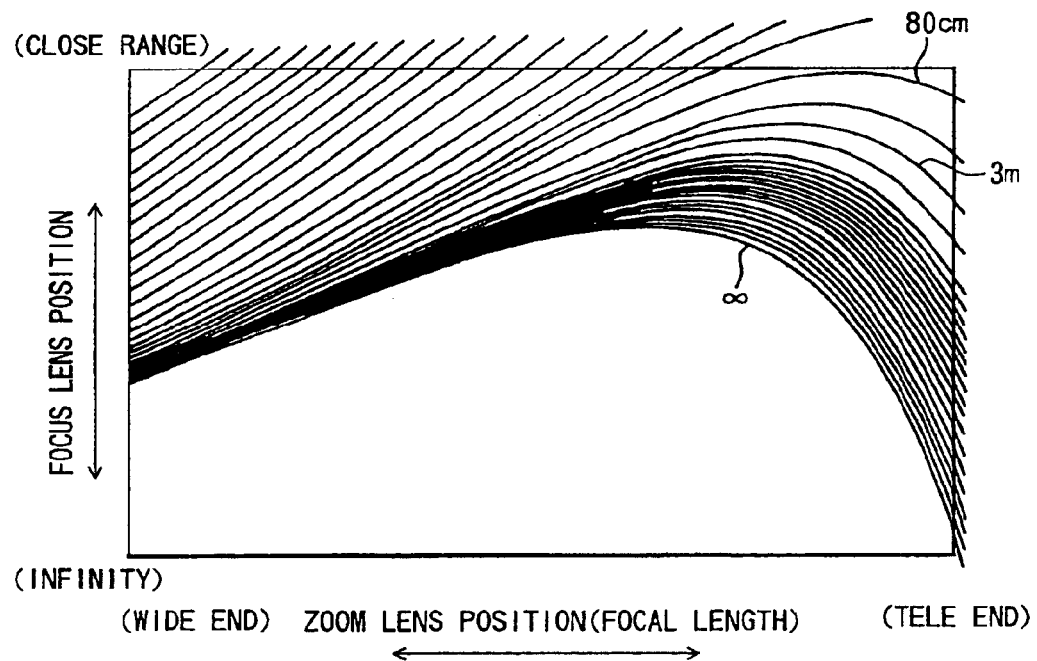
FIG. 10 is a graph illustrating the relation between the focus lens position and the zoom lens position.
Figure 11:
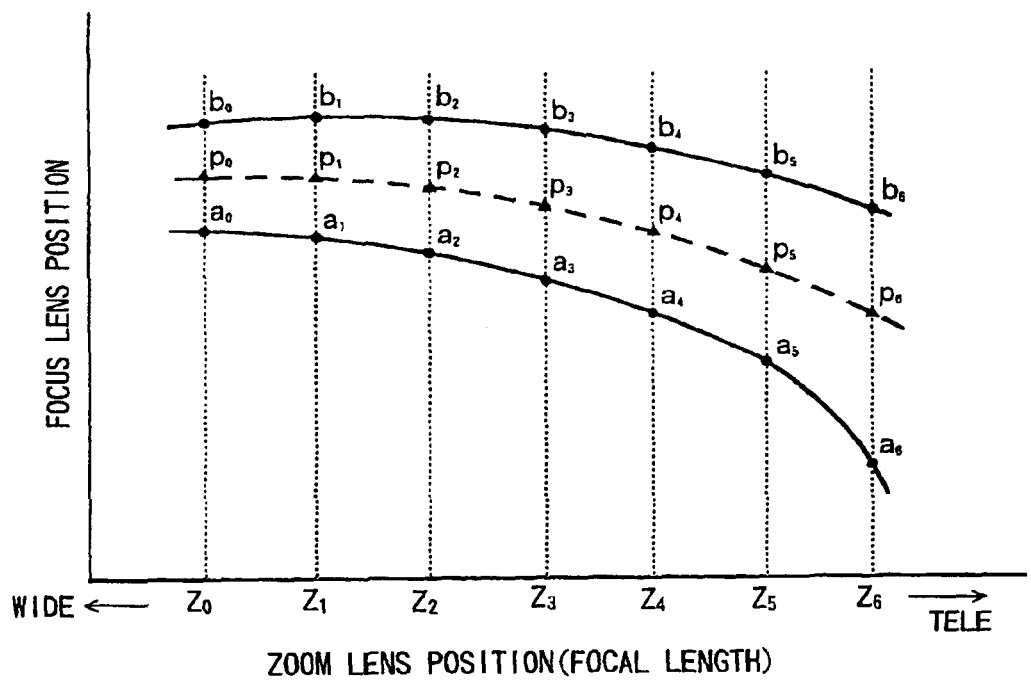
FIG. 11 is a graph illustrating an example of a conventional method for tracking a trajectory.
Figure 12:
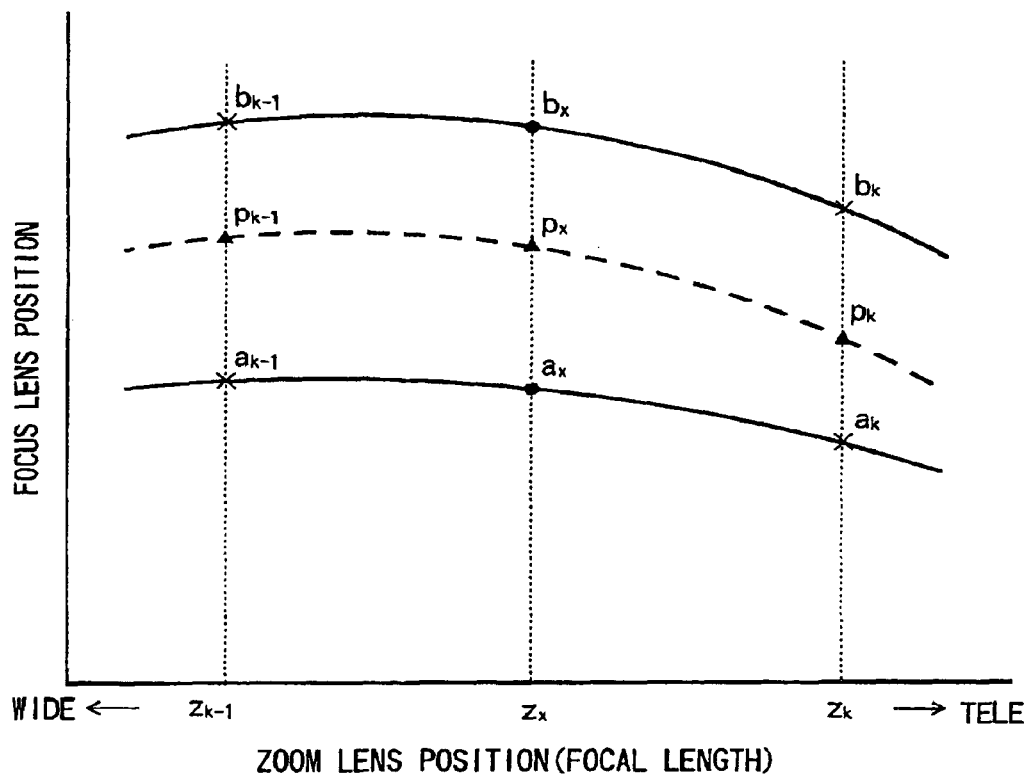
FIG. 12 is a graph illustrating a method for interpolating the zoom lens position.

Next, the procedure advances to the ordinary process routine, which is performed from S404 to S410, the lens position calculation process shown in FIG. 8 is performed independently from the process shown in FIG. 5, and the current position of the focus lens is calculated based on the value of GAIN and OFFSET of the MR sensor 142a determined in FIGS. 7(A) and 7(B).

The ordinary process routine from S404 to S410 in FIG. 5 is described below, but first, the process shown in FIG. 8 is described.

The flowchart shown in FIG. 8 illustrates the operation flow for the gain/offset adjustment process for the output of the MR sensor 142a in the ordinary control mode. The following process is performed for each of the signals with different phases that are output from the MR sensor 142a.

First, at S702, the output of the MR sensor 142a is sampled, and then at S703, the wave number at the current position of the focus lens 105 is calculated by the wave number calculation circuit 148. The reference for the wave number is determined by rewriting the wave number for the state in which the focus lens 105 is at the reference position at S402 in FIG. 5 into the adjustment value (wave number) determined at S1514 in FIG. 15. Thereafter, whenever the focus lens 105 is moved for an amount corresponding to one wavelength of the MR sensor output, the wave number at the current position can be obtained by incrementing or decrementing the wave number depending on which direction the focus lens 105 is moved.

At S704, it is judged whether the thusly obtained wave number for the current position is the same as the wave number obtained by the previous sampling. If the wave number for the current position is the same as the wave number obtained by the previous sampling, then it is not necessary to update the gain and offset values, so that the procedure advances to the gain/offset adjustment process of S707. On the other hand, if the wave number is different, then the procedure advances to S705. At S705, the gain/offset adjustment data corresponding to the current wave number are retrieved from the adjustment value storage circuit 149. At S706, the adjustment data retrieved at S705 are set in the gain/offset adjustment circuit 146. At S707, the gain/offset adjustment circuit 146 performs the gain and offset adjustment with the Equation (6), using the set adjustment data. At S708, the position calculation circuit 147 calculates the current position (lens position data) of the focus lens 105, using the MR sensor output after the adjustment of gain and offset and the process returns to S702. The lens position data obtained with the above-described lens position calculation process are sent to the camera controller 116, and used for the position control of the focus lens 105.

The following is a detailed description of the ordinary process routine from S404 to S410 in FIG. 5. This ordinary process routine exhibits the features of the present invention particularly well, and is a process routine in which the position control of the focus lens 105 is executed while compensating the displacement between the reference position at the time of adjustment and the reference position at the time of initialization, such as at power-on.

When the cam tracking or the like is calculated, a internally referenced current position $F_{adj}$ taking the coordinate axis at the time of the adjustment (first coordinate axis) as a reference is calculated by subtracting the differential value A from the current position $F_{now}$ of the focus lens 105, and a process of calculating the cam trajectory is carried out while using this internally referenced current position $F_{adj}$ and the cam trajectory table data shown in FIG. 13. Thus, it is possible to calculate the target position of the focus lens 105 such that the influence of variations in the positional accuracy of the lens mechanism (i.e. the mechanical aspects of the lens system) are compensated while calculating an internal target position $F_{adjtrgt}$ taking the origin of the first coordinate axis as a reference. On the other hand, when the actual command for focus driving is output, the differential value A is added to the internal target position $F_{adjtrgt}$, and the final target position $F_{trgt}$ (i.e. the position to which the focus lens 105 is actually moved and then stopped) is calculated for a coordinate axis (second coordinate axis; if the differential value A is not 0, then this second coordinate axis is different from the first coordinate axis) that matches the current output waveform of the MR sensor 142a and the position calculation process. Then, the camera controller 116 sends an instruction for moving the focus lens 105 to the final target position $F_{trgt}$ to the focus driving circuit 126. Thus, a lens control can be carried out with the values of GAIN and OFFSET for which fluctuations in the MR sensor output due to ambient conditions are compensated. The following is an explanation of the processes from S404 to S410.

At S404, the current position $F_{now}$ of the focus lens 105 is read in, and the differential value A obtained at S403 is subtracted from this current position $F_{now}$ to calculate the internally referenced current position $F_{adj}$.

More specifically, by subtracting the differential value A from the current position $F_{now}$ (actual position), the lens position (internally referenced current position $F_{adj}$) taking the reference origin position (origin of the first coordinate axis) of the desired cam trajectory as a reference is calculated. Then, the target position (internal target position $F_{adjtrgt}$) taking the reference origin position as a reference is calculated based on this lens position ($F_{adj}$).

At S405, the state of the zoom switch 130 is read in, and if the camera is currently being zoomed, then, at S406, the tracking calculation of the cam trajectory is carried out based on the internally referenced current position $F_{adj}$. For this calculation, the table data in FIG. 13, the current position of the zoom lens 102, and the internally referenced current position $F_{adj}$ are used to interpolate the cam trajectory with the method explained in the related art, and the tracing target of the cam trajectory is calculated. If it is determined at S405 that the camera is currently not being zoomed, then the internally referenced current position $F_{adj}$ is used at S407 to calculate the target value for the focus lens 105 (calculation for AF process).

Detailed explanations for the AF process operation have been omitted, but ordinarily the position of the focus lens 105 is controlled such that the AF evaluation value, which is sent from the AF signal processing circuit 113, becomes maximal. This AF evaluation value is generated by gating the video signal at a predetermined picture range, and extracting only a predetermined band component of the video signal within the gate frame with a bandpass filter or the like. More specifically, the band component of the video signal near 2 MHz in the gate frame is extracted, the peak is held at each horizontal scanning line, and an integration signal is formed by adding the held peak values to generate the evaluation signal.

When the AF switch 131 is off, the position of the focus lens 105 is controlled in accordance with the handling information of a manual focus handling member (not shown in the drawings) without looking up the AF evaluation value.

Then, at S408, based on the target value calculated at S406 or S407, the internal target position $F_{adjtrgt}$ (lens position taking the first coordinate axis as a reference) is determined, and the speed of the focus lens 105 is determined.

The differential value A is added to the internal target position $F_{adjtrgt}$ determined in this manner, and the final target position $F_{trgt}$ (lens position taking the second coordinate axis as a reference) is determined, and converted into the same coordinate system as the current position $F_{now}$ of the focus lens 105 (S409). At S410, a focus lens driving instruction is sent to the focus driving circuit 126 so that the focus lens 105 is moved to the final target position $F_{trgt}$ at the determined speed.

This process of outputting a driving signal for moving the focus lens 105 to the position (final target position $F_{trgt}$) obtained by adding the differential value A to the internal target position $F_{adjtrgt}$ (target position) is performed by the camera controller 116.

It should be noted that detailed explanations for the operation of the zoom lens have been omitted from the flowchart in FIG. 4, but the zoom lens 102 is controlled such that it moves at a predetermined constant speed in a driving direction that depends on the state of the zoom switch 130 at S405.

It should be noted that in this embodiment, the output of the MR sensor 142a (position detection signal) has two phases, namely a sine wave and a cosine wave, but the present invention is not limited to this, and can also be applied to configurations in which the output of the MR sensor 142a has three or more phases. Here, the reason why at least two position detection signals with different phases is needed, is because the movement direction of the focus lens can be distinguished based on the advancing or delaying of the phase of two sine-shaped signals with a phase difference, and the displacement amount is detected by adding or subtracting to or from the wave number with a counter.

In this embodiment, a linear motor is used as the actuator for the focus lens 105, and the MR sensor 142a is used as the sensor for detecting the position of the focus lens 105, but there is no limitation to this, and the present invention can also be applied to the driving control of the zoom lens.

Furthermore, in this embodiment a magnetic MR sensor is used, but it is also possible to perform a similar interpolation process with any sensor outputting a periodically changing detection signal, with for example sine-shaped signal intensity, and there is no limitation to magnetic MR sensors. For example, it is also possible to apply the present invention to a configuration using an optical sensor.

That is to say, as shown in FIG. 2(B), it is possible to detect the position of a focus lens 105 using an optical scale 142d and an optical encoder 142c.

The optical encoder 142c includes a light-emitting portion and a light-receiving portion, light that has been emitted by the light-emitting portion is reflected by the optical scale 142d, and a signal corresponding to the light amount received by the light-receiving portion is output. The optical scale 142d is made of a reflective member of glass or a molded material, and has a reflection surface whose shape (orientation) changes periodically with respect to a direction parallel to the optical axis.

Then, a sine-shaped signal similar to that of the MR sensor is generated by processing of the optical signal received from the optical encoder 142c and the shape of the optical scale 142d.

As explained above, in a lens system in which a highly accurate position detection is performed by combining an absolute position component and a relative position component, displacements of the position of the origin in a cam trajectory data table that has been previously stored in the controller can be prevented, and it becomes possible to track the actual trajectory accurately and without image blur when zooming, by storing a position displacement amount at a reference position between the current position and the position at the time of adjustment, and distinguishing between a coordinate system based on the current position and a coordinate system based on an adjusted position for which this displacement has been compensated.

What is claimed is:

1. A lens control apparatus that outputs, to a driving unit that drives a lens in an optical axis direction, a driving signal for moving the lens, the lens control apparatus comprising:

a position sensor that outputs a detection signal that changes periodically in accordance with a movement of the lens;

a first calculation unit that calculates a differential value between a phase component of position detection data that have been obtained based on a detection signal of the position sensor when the lens has been moved to a predetermined reference position and a phase component of position control data for controlling the position of the lens and corresponding to the reference position;

a second calculation unit that calculates the target position in the position control data based on the position detection data and the differential value; and a control circuit that outputs the driving signal based on the differential value and the target position in the position control data.

2. The lens control apparatus according to claim 1, wherein the position sensor comprises a magnet member that is periodically magnetized, and a magnetic detector that moves relative to the magnet member when the lens is moved and that outputs a plurality of the position detection signals having different phases, in response to magnetic changes due to that movement.

3. The lens control apparatus according to claim 1, wherein the position sensor comprises an optical scale member having a reflection surface whose shape changes periodically, and an optical detector that moves relative to the optical scale member when the lens is moved and that outputs a plurality of the position detection signals having different phases, in response to a received light amount among light that has been projected to and reflected by the scale member, which changes due to the movement.

4. A camera comprising:

a lens;

a driving unit that drives the lens in an optical axis direction; and a lens control apparatus according to claim 1.

5. A lens control method for a control apparatus having a position sensor that outputs a detection signal that changes periodically in accordance with a movement of a lens, and outputting, to a driving unit that drives the lens in an optical axis direction, a driving signal for moving the lens to a target position, the method comprising:

a first step of calculating a differential value between a phase component of position detection data that have been obtained based on a detection signal of the position sensor when the lens has been moved to a predetermined reference position and a phase component of position control data for controlling the position of the lens and corresponding to the reference position;

a second step of calculating the target position in the position control data based on the position detection data and the differential value; and a third step of outputting the driving signal based on the differential value and the target position in the position control data.

6. A lens control apparatus that outputs, to a driving unit that drives a lens in an optical axis direction, a driving signal for moving the lens, the lens control apparatus comprising:

position sensing means for outputting a detection signal that changes periodically in accordance with a movement of the lens;

first calculation means for calculating a differential value between a phase component of position detection data that have been obtained based on a detection signal of the position sensing means when the lens has been moved to a predetermined reference position and a phase component of position control data for controlling the position of the lens and corresponding to the reference position;

second calculation means for calculating the target position in the position control data based on the position detection data and the differential value; and control means for outputting the driving signal based on the differential value and the target position in the position control data.

7. The lens control apparatus according to claim 6, wherein the position sensing means comprises a magnet member that is periodically magnetized, and a magnetic detector that moves relative to the magnet member when the lens is moved and that outputs a plurality of the position detection signals having different phases, in response to magnetic changes due to that movement.

8. The lens control apparatus according to claim 6, wherein the position sensing means comprises an optical scale member having a reflection surface whose shape changes periodically, and an optical detector that moves relative to the optical scale member when the lens is moved and that outputs a plurality of the position detection signals having different phases, in reponse to a received light amount among light that has been projected to and reflected by the scale member, which changes due to the movement.

9. A camera comprising:

a lens;

driving means that drives the lens in an optical axis direction; and a lens control apparatus according to claim 6.

* * * * *

UNITED STATES PATENT AND TRADEMARK OFFICE
CERTIFICATE OF CORRECTION

PATENT NO. : 6,954,589 B2
DATED : October 11, 2005
INVENTOR(S) : Hiroto Okawara

It is certified that error appears in the above-identified patent and that said Letters Patent is hereby corrected as shown below:

Column 8,
Lines 19 and 21, "picked up" should read -- picked-up --.

Column 10,
Line 52, "has not been" should read -- has not --.

Column 12,
Line 48, "calculated, a" should read -- calculated, an --.

Signed and Sealed this

Thirtieth Day of May, 2006

JON W. DUDAS
*Director of the United States Patent and Trademark Office*